INVENTOR
JOHN F. GALLO
BY Christopher L. Waal
ATTORNEY

April 25, 1967  J. F. GALLO  3,315,294
GLASS WASHING MACHINE
Filed Sept. 1, 1965  2 Sheets-Sheet 2
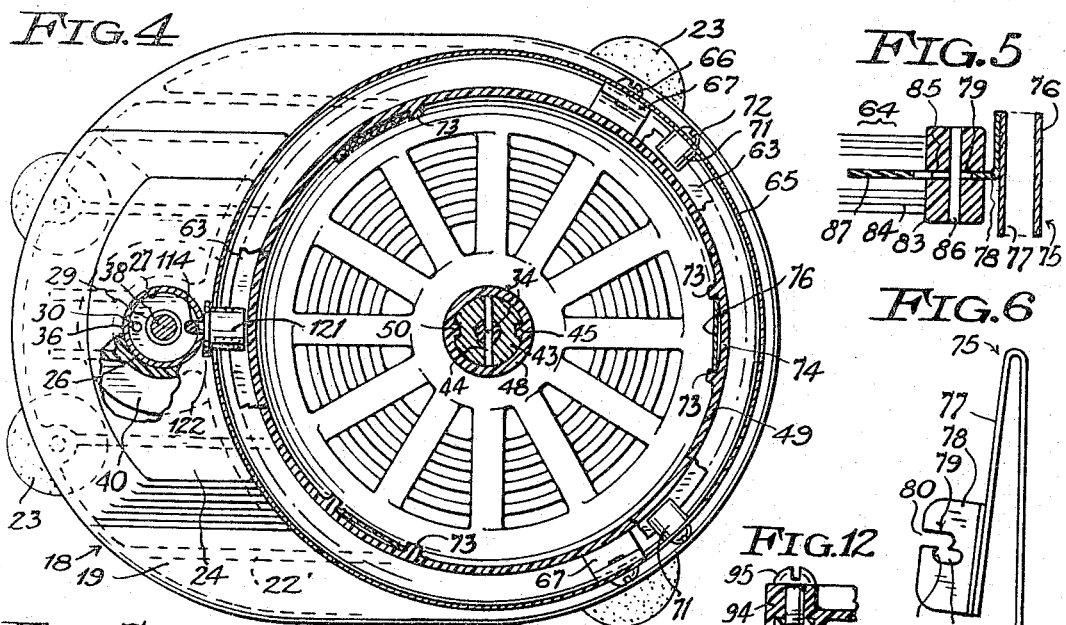
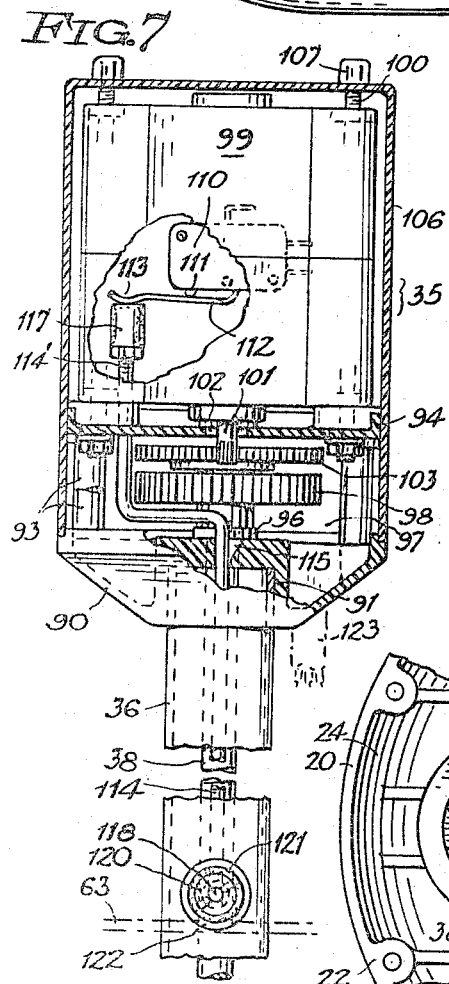
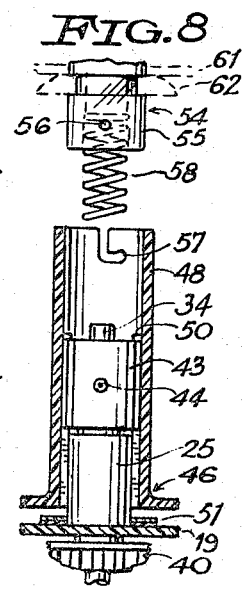
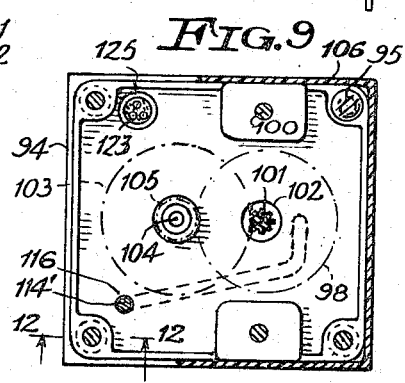
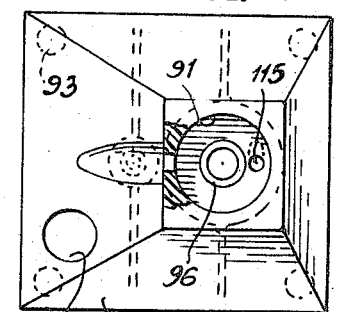
INVENTOR
JOHN F. GALLO
BY Christopher L. Waal
ATTORNEY

United States Patent Office 3,315,294
Patented Apr. 25, 1967

3,315,294
GLASS WASHING MACHINE
John F. Gallo, 3530 19th Ave., Kenosha, Wis. 53140
Filed Sept. 1, 1965, Ser. No. 484,375
8 Claims. (Cl. 15—76)

This invention relates to glass washing machines adapted for use in cleaning drinking glasses and similar receptacles.

A type of portable washing machine heretofore devised for use in restaurants, soda fountains, and taverns is arranged to be removably rested in a wash sink or tank and includes rotary scrubbing or brushing means to which an inverted drinking glass or other receptacle is manually applied to effect a scrubbing operation. A glass washing machine of this general type is disclosed in my application Ser. No. 327,964, filed Dec. 4, 1963, now Patent No. 3,204,273.

An object of the invention is to provide an improved and durable glass washing machine of this general character which is of simplified construction and which will substantially reduce the cost of manufacture and facilitate assembly and maintenance.

Another object is to provide a glass washing machine having a rotary bushing unit which includes an improved hollow brush carrier of cup-like shape capable of ready installation and removal and which further includes improved brush mounting means permitting easy detachment and replacement of pivoted bushes of the unit while preventing accidental dislodgement of these brushes.

Still another object is to provide a glass washing machine which is of relatively light weight permitting economical shipment and easy handling.

A further object is to prefect details of construction generally.

The invention further consists in the several features hereinafter described and claimed.

In the accompanying drawings,

FIG. 4 is a horizontal sectional view taken generally on the line 4—4 of FIG. 2;

FIG. 5 is a detail transverse sectional view of an outside brush and its mounting, taken generally on the line 5—5 of FIG. 2;

FIG. 6 is a side elevational view of a brush mounting bracket for one of the outside brushes;

FIG. 7 is a fragmentary detail elevational view of a driving motor unit and its control switch means, parts being shown in section;

FIG. 8 is a fragmentary detail elevational view of brush driving parts with an axial brush core in disconnected condition, parts being shown in section;

FIG. 9 is a top plan view of a frame member for a motor unit, parts being shown in section on the line 9—9 of FIG. 2;

FIG. 10 is a bottom plan view of the frame member, parts being broken away and parts being shown in section;

FIG. 11 is a fragmentary bottom view of the driving shaft end of the base; and

FIG. 12 is a detail sectional view taken on the line 12—12 of FIG. 9.

Figure 1:
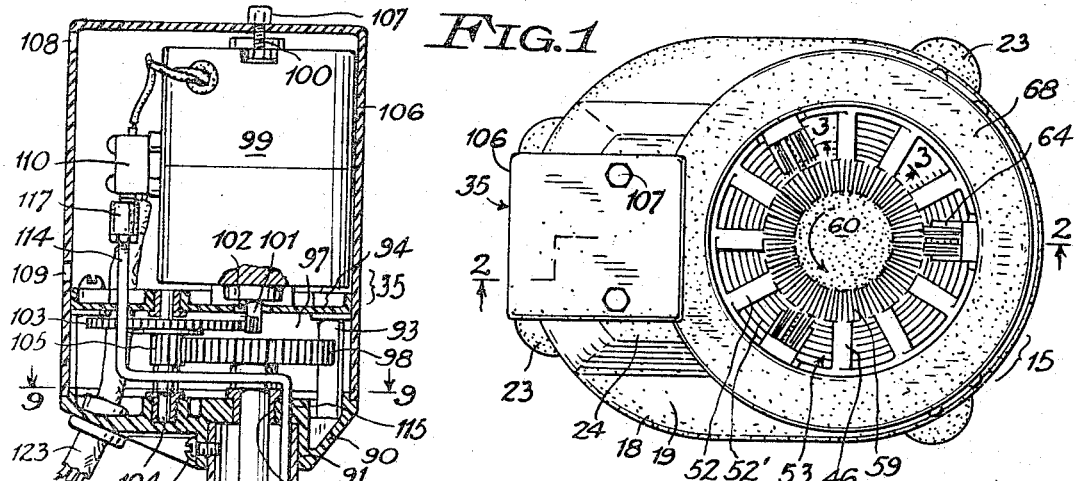
FIG. 1 is a top plan view of a glass washing machine constructed in accordance with the invention.

In the drawings, the numeral 15 designates generally a glass washing machine embodying the invention. The invention is here shown to be of portable self-contained construction and is adapted to be removably mounted in an existing wash sink or basin 16 having a horizontal bottom wall 17.

The machine includes a base 18 of generally elliptical shape having a horizontal top wall 19 and a rounded, downturned marginal flange 20, the base forming therebelow an open-bottom chamber 21. The base is in the form of a relatively rigid, high-impact plastic molding, such as of polypropylene and its copolymers, the base being mechanically strong although of relatively light weight and capable of inexpensive fabrication. Lugs or embossments 22 are integrally formed at the inner side of the marginal flange 20 flush with the lower edges of the flange and have secured thereto rubber suction cups 23 adapted to rest on the bottom wall of the sink, thus firmly supporting the base. The underside of the base is provided with longitudinal ribbing 22'.

Spaced along the major axis of the base and upstanding from the base top wall are a pair of hollow embossments 24 and 25. The embossment 24 is disposed at an end of the base and is of flat-topped arcuate or crescent shape, conforming to the curvature of the base end and opening downwardly. This embossment, which is of downwardly divergent shape at its outer sides, includes therein a vertical tubular portion 26 at the major axis of the base and disposed at the concave side of the embossment, the tubular portion forming an upwardly opening cylindrical socket 27 and having an internal hub 28 at its lower end with a central bearing bushing 29 and one or more drain openings 30. The inner side of the arcuate embossment 24 presents a cylindrically curved vertical wall 31, the center of curvature being in the vertical plane of the central or major axis of the base. The upstanding embossment 25 is in the form of a vertical tubular hub provided with bearing bushings 32, the adjacent curved end of the base having a radius of curvature extending from the axis of this hub-forming embossment.

A rotary brushing or scurbbing unit 33, hereinafter more fully described, is mounted on the base and includes a vertical shaft 34, such as of stainless steel, journalled in the aligned bushings 32, the lower end of the shaft extending into the base chamber 21. Driving means for the brushing unit includes a motor unit 35, hereinafter more fully described, supported in elevated position on the upper end of a tubular column or post 36, the lower end of which is rigidly secured, as by a press fit and a screw 37, in the vertical socket 27 of the base embossment 24. The driving means further includes a vertical driving shaft 38, such as of stainless steel, extending downwardly from a driving connection with the motor unit through the tubular post and into the hollow base, the shaft being disposed coaxially in the post and being journalled in the bushing 29. A belt drive 39 connects the lower ends of the driving shaft 37 and brush shaft 34 and is housed in the hollow base. The belt drive comprises marginally flanged hubbed sprocket pulleys 40 which are detachably fixed to the flatted lower ends of the shafts 34 and shaft 38 in the base chamber, and are drivingly connected by a positive drive toothed rubber belt 41 such as of the fiber-glass-reinforced type. The belt drive is relatively quiet in operation and can safely be exposed to the liquid in the sink or basin, thus avoiding the need for a sealed lubricant chamber. Also, the positive drive belt obviates the need for belt tightening or adjustment. Each sprocket pulley 40 is formed of a molded plastic, such as polypropylene, and is detachably held on the associated shaft by a cotter pin 42 extending in a cross slot 42' in the sprocket hub. This construction facilitates assembly of the belt drive from the open bottom of the base.

The rotary brushing unit or assembly 33 includes a cylindrical collar 43 which is fixedly secured, as by a cross pin 44, on the upper portion of the brush shaft 34 and rests on the upper end of the upper bearing bushing 32 to confine the shaft against axial displacement. The collar 43 is provided with diametrically opposite keyways 45. The brushing unit further includes an open-topped cup-like member or basket 46 of molded plastic, such as polypropylene, having an apertured bottom wall 47 from which upstand a central tubular hub or sleeve 48 and a concentric cylindrical outer wall 49. The tubular hub or sleeve 48 surrounds the shaft collar 43 and has a pair of diametrically opposite internal splines 50 slidably interengageable with the collar keyways 45, thus serving to guide and drive the basket while permitting a limited axial displacement of the basket. Thrust washers 51, such as of Teflon, surround the base hub 25 and rest on the base top wall 19, and are adapted to be engaged by the bottom wall of the basket when the basket is depressed, as hereinafter described.

Figure 3:
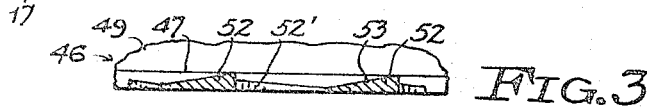
FIG. 3 is a detail sectional view taken generally on the line 3—3 of FIG. 1.

The apertured bottom wall 47 of the basket constitutes a screen or grid formed of radial spokes 52 which have inclined upper surfaces 53, FIG. 3, so as to form impeller blades for creating a liquid circulation when the basket is rotated. The spokes are integrally connected by a series of radially spaced concentric ribs or cross bars 52', thus forming a screen.

A central brush 54 for cleaning the inside of a drinking glass G is carried and driven by the central hub or sleeve 48 of the basket and includes a vertical tubular brush core 55, such as of nylon, having its lower end fitting in the upper end of the sleeve and detachably secured thereto by a tubular cross pin 56. An end of the cross pin is detachably engaged in a bayonet slot 57 formed in the upper portion of the sleeve, FIGS. 2 and 8, thus not only securing the brush core to the sleeve but also providing a driving connection between the sleeve and the brush core. A compressed coil spring 58 is axially disposed in the lower end of the tubular brush core and has its upper end anchored on the cross pin 56. The lower end portion of the spring surrounds the upper end portion of the brush shaft 34 and bears on the upper end face of the drive collar 43, thus urging the sleeve and connected brush upwardly, this upward displacement being limited as hereinafter described.

The central brush 54 is generally similar to that disclosed in the above-mentioned application, having lateral bristles 59 and a top bristle tuft 60. If desired, a rubber squeegee disk 61 and subjacent rubber washer 62 with a rounded upper surface may be mounted on the brush core below the lateral bristles.

The cylindrical wall 49 of the rotary tub or basket 46 is provided near its upper end with an outwardly projecting annular track flange 63 which forms part of a motor switch actuating means and also forms part of a means to limit the spring-urged upward displacement of the basket as hereinafter described. In addition, the basket demountably carries therein resiliently supported outside cleaning brushes 64, as hereinafter described.

An upright cylindrical outer casing or shell 65, such as of stainless steel, concentrically surrounds the rotary brushing unit and is here shown to have reversely folded upper and lower edges. The lower edge portion of the casing is secured to the hollow base by the screw 37, and also by screws 66 which engage lugs 67 upstanding from the marginal portion of the base and disposed at the inner wall of the casing. The upper edge of the outer casing projects a short distance above the basket 46 and detachably carries a flat horizontal bumper ring or guard ring 68, such as of molded resilient plastic, having depending outer and inner flanges 69 and 70, the outer flange 69 frictionally fitting over the upper edge of the casing. The inner diameter of the bumper ring is slightly smaller than the basket diameter. The top bristle tuft 60 of the rotary inside brush projects a short distance above the plane of the bumper ring.

One or more cylindrical plugs 71, such as of nylon, are detachably secured by screws 72 to the inside of the cylindrical casing 65 and lie slightly above the upper flat face of the annular basket flange 63 at a region remote from the post 36. Preferably, two plugs 71 are provided, and are equally spaced on opposite sides of the vertical plane of the machine. By way of example, the two plugs may have an angular spacing of about 90°, as seen in FIG. 4. These plugs serve to limit lateral deflection of the upper edge portion of the slightly resilient basket.

Figure 2:
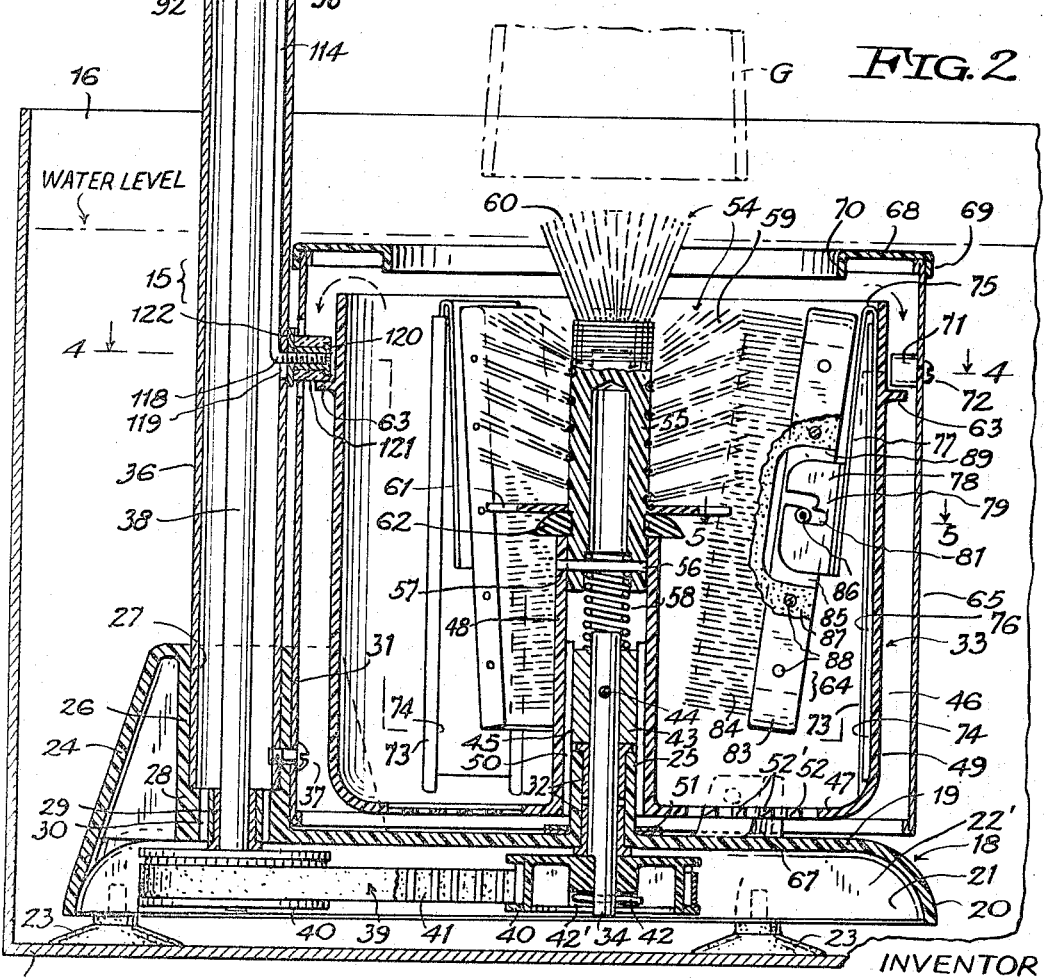
FIG. 2 is an enlarged sectional elevation of the machine, taken generally on the line 2—2 of FIG. 1.

The cylindrical basket wall 46 is provided at its inner side with equi-angularly spaced pairs of axially extending parallel ribs 73 forming dovetail channels 74 between them, three of such channels being shown in the present instance. Leaf spring brush-mounting brackets 75 of inverted V-shape are bent from lengths of stainless steel and each includes a flat vertical shank or anchor portion 76 and an inwardly and downwardly projecting spring arm portion 77. The anchor portions of the brackets are adapted to be pushed downwardly into the respective dovetail channels 74 where they are frictionally retained. The lower ends of the channels form stops for the anchor portions. The free lower ends of the spring arms 77 are angled inwardly and are provided with respective inwardly projecting ears or clips 78 of stainless steel disposed in radial vertical planes, each ear having a radially opening slot or notch 79 of offset form, as seen in FIGS. 2 and 6. The outer end portion 80 of the notch, which opens at the edge of the ear, is higher than the downwardly offset end portion 81, and the front end of the latter end portion presents a hook-like shoulder 82.

The spring arms 77 pivotally carry the respective outside cleaning brushes 64, three being provided in the present instance. Each brush comprises a bar-like brush back 83, such as of molded nylon, carrying bristles 84 projecting toward the vertical axis of the rotary brush unit. Each brush back has a central guide slot 85 therethrough extending longitudinally of the back and detachably receiving the corresponding mounting ear 78. A tubular cross pin 86 in the brush back extends across the slot 85 about midway of the length of the brush back and is received in the ear notch, occupying the downwardly offset inner portion 81 of the notch. Each brush back is thus confined to swing in a vertical radial plane. The brush back cross pin 85 may shift in the lower portion 81 of the ear notch but cannot leave the notch unless the brush back is lifted to place the pin in the upper entrance portion of the notch. A soft rubber squeegee strip 87 is anchored in the brush back slot, as by cross pins 88, and its projecting edge portion is flanked at opposite sides by the brush bristles. The outer edge portion of the squeegee strip has a notch 89 to clear the mounting ear 78.

The elevated motor unit 35 includes an internally ribbed lower frame member 90 of inverted truncated pyramidal shape having a downwardly opening cylindrical socket 91 rigidly receiving the upper end of the hollow post 36, as by a press fit, the post being additionally secured by a set screw 92. The frame member is provided with integral corner pillars 93 the upper ends of which are socketed in and rigidly secured to a superposed, plate-like, marginally flanged, motor-supporting upper-frame member 94, as by screws 95, FIGS. 9 and 12. These two frame members are formed of a molded plastic, such as polypropylene. The lower frame member 90 is provided centrally above the socket 91 with a vertical bushing 96 in which is journalled the upper end of the driving shaft 38. The space between the two frame members forms a gear chamber 97. A hubbed gear 98 is fixed on the upper end of the driving shaft and rests on the bushing 96 to vertically support the shaft.

An electric motor 99 is vertically mounted on the upper frame member 94 and is secured thereto by screw studs 100. The motor has a pinion-carrying shaft 101 projecting downwardly through an opening 102 in the upper frame member and meshing with a gear 103 fixed to a vertical countershaft 104 journalled at opposite ends in bushed portions of the two frame members. A pinion gear 105 below and coaxially fixed to the gear 103 meshes with the gear 98 on the upper end of the driving shaft. Except for the motor shaft pinion, the several gears are preferably formed of a suitable molded plastic. The motor and reduction gearing are enclosed by a detachable cover or housing 106 of molded plastic, the marginally rabbeted lower frame member forming a seat for the lower edge of the cover. The cover is secured by plastic cap nuts 107 engaging the upwardly extended ends of the motor mounting screw studs 100. A side wall of the cover is provided with groups of upper and lower ventilating openings 108 and 109.

A motor switch 110, actuated as hereinafter described, is mounted on a side of the motor remote from the axis of the brush unit and is desirably of a normally-closed Micro Switch type spring-urged to closed position and having the usual projecting switch plunger 111 displaceable upwardly or inwardly to switch-opening position by a resiliently mounted lever 112 provided with a rounded free end 113. A switch actuating rod 114 extends longitudinally within the hollow post 36 and slidably extends through a guide opening 115, FIG. 7, in the frame member 90. The rod has a laterally offset vertical upper end portion 114′ slidably guided in an opening 116 in the frame member 94, the upper extremity of the offset portion having screw-threaded thereon an insulating button 117, such as of nylon, engageable with the underside of the rounded end of the switch lever. The switch actuating rod has a laterally bent lower end 118 which extends through a short vertical slot 119 in the hollow post 36 and is threaded to receive a headed sleeve nut 120 which carries thereon a nylon roller 121. In some instances, a washer 122 may be placed on the lower rod end between the roller and the outer wall of the post. The roller rides on the upper track-forming surface of the peripheral flange 63 of the rotary brush-carrying basket 47. The basket is normally urged upwardly by the coil spring 58, thus lifting the switch-actuating rod to hold the motor switch 110 in its open condition when the machine is not active. The motor current is supplied through a power cord 123 passing through openings 124 and 125 in the respective frame members 90 and 94, the cord being connected in series with the switch. The cord is preferably of the type including a grounding wire.

In use, the glass washing machine is detachably set in the wash sink or basin 16 in which water, or detergent solution, or sterilizing solution, is maintained at a suitable level, the motor and control switch of the machine being disposed well above the liquid level. The glass or tumbler G to be washed is held in inverted position by the user's hand grasping the bottom portion of the glass, and is passed downwardly over the central or inside brush 54, the bristles of which engage the inner side walls and interior bottom wall of the glass, and the resilient, deflectable squeegee disk 61 of which has a passing rubbing engagement with the rim portion of the glass. The pivoted resiliently mounted outside brushes 64 are forced apart by the downwardly displaced glass, and the bristles and squeegee strips thereof conformably engage the outer walls of the glass. Downward manual pressure on the hand-held glass as it is urged downwardly on the central brush depresses this brush a short distance, for example $1/16''$ to $3/16''$, against the action of the coil spring 58, thus permitting the switch actuating rod 114 to descend the same distance, and allowing the switch 110 to assume its normally closed position, whereupon the motor will start in operation. The motor drives the rotary brush assembly at a suitable speed, for example 150 to 250 r.p.m., through the drive belt 41, causing the brushes to clean the interior and exterior walls of the glass while the glass is manually held against rotation. The rubber squeegee disk 61 on the central brush and the squeegee strips 87 on the outside brushes assist in cleaning the rim of the glass. During rotation of the brush assembly the nylon roller 121 rides on the annular basket flange 63. The impeller blades 52 at the bottom wall of the rotating basket promote circulation of the liquid, urging the liquid upwardly in the basket. The cleaned drinking glass is then lifted off the brush assembly, causing the inside brush to rise under urge of the spring 58, so that the switch actuating rod 114 will be lifted by the annular basket flange 63 to open the motor switch, thus automatically stopping the motor. The insulated plastic walls of the motor unit 35 minimize danger of chipping of glassware coming in accidental contact with these walls, and also minimize danger of electrical shocks.

When the brushes require removal for cleaning or replacement, the power cord is disconnected from the power source and the center brush 54 is pushed down and then twisted (counterclockwise in the present instance) to release it from the bayonet joint, whereupon the brush can be lifted off the central sleeve of the basket. The side brushes are then disconnected from their mounting ears or clips 78, the pivot pins 86 of these brushes being disengaged from the offset ear notches 79. When replacing the brushes the side brushes are installed first, and the center brush is installed by entering the spring-carrying brush core 55 into the upper end of the basket sleeve 48, and then engaging the cross pin 56 into the bayonet slot 57.

The screen-forming bottom wall of the basket serves to hold any pieces of broken glass or other debris which might otherwise interfere with the operation of the machine. By way of example, switch actuating depression of the basket might be prevented by the presence of a piece of broken glass below the basket.

When assembling the machine, the basket 46 is lowered into the casing in the absence of the detachable guard ring 68 and is engaged over the drive collar 43 on the shaft 34, the basket being sufficiently resilient so that its upper portion may be sprung laterally to clear the switch-actuating roller 121. The nylon plugs 71 are then secured to the inside of the casing 65, the roller 120 and these plugs then serving to limit lateral deflection of the basket and insuring proper engagement of the switch-actuating roller with the peripheral basket flange 63. The basket can readily be removed for cleaning purposes after detachment of the plugs 71. However, for removal of loose debris from the basket it is sufficient to detach the brushes and invert the machine.

The present invention provides an improved glass washing machine which is of simple and inexpensive construction and of relatively light weight and which is efficient and reliable in operation.

I claim:

1. In a glass washing machine adapted for operation in a cleaning liquid and including a base, a basket projecting above and rotatably mounted on said base, said basket including an apertured bottom wall and an outer cylindrical wall, and brushing means carried by said rotary basket and adapted to be engaged by an inverted glass passed downwardly into the basket, said bottom wall constituting an apertured screen comprising a grid formed of circumferentially spaced radial spokes with inclined upper surfaces within the basket and which constitute liquid impellers for effecting upward flow of liquid into the basket, and radially spaced cross ribs spanning circumferentially between said spokes, the spaces between said cross ribs providing apertures through which liquid flows into the basket.

2. In a glass washing machine having rotary brushing means, said means including a brush-carrying basket of molded plastic having an apertured bottom wall constituting an apertured screen comprising a grid formed of circumferentially spaced radial spokes with inclined upper surfaces within the basket and which constitute liquid impellers for effecting upward flow of liquid into the basket, and radially spaced cross ribs spanning circumferentially between said spokes, the spaces between said cross ribs providing apertures through which liquid flows into the basket, and a central drive sleeve and an outer cylindrical wall with an exterior peripheral flange at its upper portion.

3. In a glass washing machine, a base, rotary brushing means projecting above and rotatably mounted on said base and including a depressible basket having a cylindrical wall with an exterior peripheral flange at its upper portion, a stationary cylindrical open-topped casing concentrically surrounding said basket and fixed to said base, basket-driving means including an electric motor, motor-controlling switch means including a part riding on said flange to be actuated upon depression of said basket, and spacing means carried by said casing and interposed between said casing and basket above said flange to limit lateral deflection of said basket.

4. A glass washing machine as defined in claim 3, wherein the spacing means are detachably mounted on the casing and the flange-carrying basket is resilient and can be laterally sprung in the absence of said spacing means to pass said flange-riding part, whereby to permit entry and removal of the basket with respect to the casing.

5. In a glass washing machine having rotary brushing means including a rotary support and a side brush engageable with the outer surface of a glass, and a brush-holding bracket comprising an inverted V-shaped leaf spring having a downwardly projecting anchor shank interengageable with said support and a downwardly and inwardly inclined spring arm on the lower portion of which said side brush has a pivotal interengagement.

6. In a glass washing machine having a base and a rotary brushing unit rotatably carried by said base and projecting upwardly therefrom and having brush elements, said brushing unit including a one-piece basket having a cylindrical wall portion and an apertured bottom wall and a central sleeve-like hub projecting upwardly from the bottom wall, said basket having an exterior track-forming annular flange at its upper portion adapted to cooperate with motor-controlling switch means of the machine, and said cylindrical wall portion being formed with interior longitudinally extending channels adapted to detachably mount said brush elements of the brushing unit.

7. In a glass washing machine having glass-brushing means projecting above and rotatably mounted on a base and including a rotatable central brush and a radially displaceable outside brush, said outside brush being adapted to engage the outer walls of an inverted glass and being provided with a brush back having a longitudinal guide slot and a pivot-forming cross pin intersecting said slot, a radially resilient support for said outside brush including a flat radial ear movably fitting in said guide slot, said ear having a notch adapted to receive said cross pin, said notch having an entrance portion opening at the inwardly facing edge of said ear and further having a downwardly offset radially extending portion projecting beyond said entrance portion and normally occupied by said cross pin, said downwardly offset notch portion presenting a stop shoulder at the end thereof adjacent said entrance portion engageable by said cross pin to resist accidental dislodgment of said outer brush.

8. In a glass washing machine having glass-brushing means projecting above and rotatably mounted on a base, said brushing means including a basket having a cylindrical wall with angularly spaced pairs of peripherally spaced longitudinally extending ribs integrally formed thereon at its inner side, each pair of ribs forming between them a bracket-retaining channel, and leaf spring brush mounting brackets each having a downwardly projecting anchor portion and a downwardly and inwardly inclined resilient arm connected to the upper end of said anchor portion, said anchor portion being slidably received in the associated channel, and said resilient arm being adapted to pivotally retain a radially displaceable outside brush.

References Cited by the Examiner

UNITED STATES PATENTS

| | | | |
|---|---|---|---|
| 923,888 | 6/1909 | Post | 68——151 |
| 2,046,109 | 6/1936 | Sunne et al. | 259—129 |
| 2,158,904 | 5/1939 | Meeker et al. | 15—76 |
| 2,255,080 | 9/1941 | Nielsen | 15—76 |
| 2,255,081 | 9/1941 | Nielsen et al. | 15—76 |
| 2,701,698 | 2/1955 | Holstein. | |
| 3,204,273 | 9/1965 | Gallo | 15—76 |

CHARLES A. WILLMUTH, *Primary Examiner.*

E. L. ROBERTS, *Assistant Examiner.*